United States Patent [19]

Gustafsson

[11] Patent Number: 5,411,354
[45] Date of Patent: May 2, 1995

[54] TOOL PROVIDED WITH AN INSERT FOR CUT-OFF OR SIMILAR TURNING OPERATIONS, AND SPACER ELEMENT FOR AN INSERT IN SUCH A TOOL

[75] Inventor: Lars-Erik Gustafsson, Sandviken, Sweden

[73] Assignee: Sandvik AB, Sweden

[21] Appl. No.: 53,268

[22] Filed: Apr. 28, 1993

[30] Foreign Application Priority Data

Apr. 28, 1992 [SE] Sweden .................................. 9201324

[51] Int. Cl.[6] ......................... B23B 27/08; B23B 29/12
[52] U.S. Cl. .................................... 407/110; 407/104; 407/117
[58] Field of Search ............... 407/104, 105, 107, 110, 407/111, 112, 117

[56] References Cited

U.S. PATENT DOCUMENTS

| | | | |
|---|---|---|---|
| 2,982,008 | 5/1961 | Facknitz | 407/112 |
| 3,084,416 | 4/1963 | Broughton | 407/104 |
| 3,171,188 | 3/1965 | Stier | 407/112 |
| 3,240,382 | 4/1966 | Zierden | 407/111 |
| 3,543,363 | 12/1970 | Diemond | 407/110 |
| 3,688,366 | 9/1972 | Jones . | |
| 4,357,123 | 11/1982 | Zweekly | 407/110 |
| 4,573,832 | 3/1986 | Zinner . | |
| 4,580,930 | 4/1986 | Zinner | 407/110 |
| 4,600,341 | 7/1986 | Board | 407/112 |
| 4,801,224 | 1/1989 | Pettersson et al. . | |
| 4,938,639 | 7/1990 | Lockard | 407/103 |
| 5,100,268 | 3/1992 | Nakayama et al. | 407/104 |
| 5,161,920 | 11/1992 | Zinner | 407/117 |

FOREIGN PATENT DOCUMENTS

| | | | |
|---|---|---|---|
| 853475 | 8/1977 | Belgium . | |
| 8804365.7 | 5/1988 | Germany . | |
| 136490 | 10/1979 | Japan | 407/112 |

Primary Examiner—William E. Terrell
Attorney, Agent, or Firm—Burns, Doane, Swecker & Mathis

[57] ABSTRACT

A cut-of tool comprises a thin holder plate of steel, and a cutting insert of cemented carbide. The holder plate has an outwardly opening, insert-receiving recess defined by a bottom wall, an inner wall and an upper wail which is part of an elastically movable clamping arm serving to retain the insert in the recess. The insert has both upper and lower grooves of V-shaped cross-section, which are adapted to cooperate with corresponding V-shaped ridges associated with the recess. Between the insert and the bottom wall of the recess, there is provided a dismountable spacer element of cemented carbide, which has on its upper side a V-ridge for engaging a corresponding V-groove in the underside of the insert. The spacer element is maintained in place, on the one hand, by a countersunk connecting device in the area of the outer end of the bottom wail and, on the other hand, by a male-female connection between the inner wall of the recess and a rear end of the element.

21 Claims, 3 Drawing Sheets

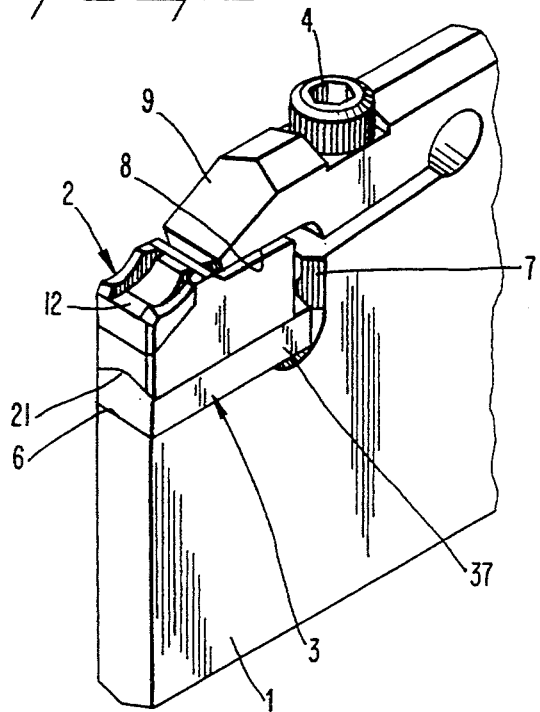
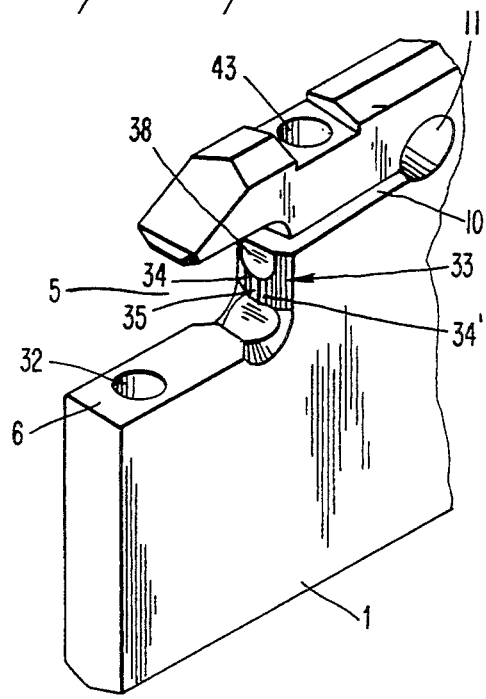
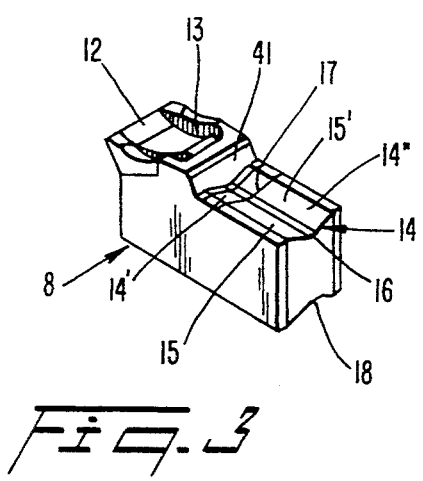
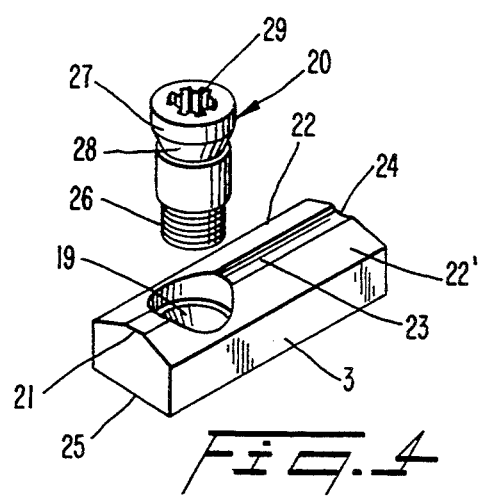

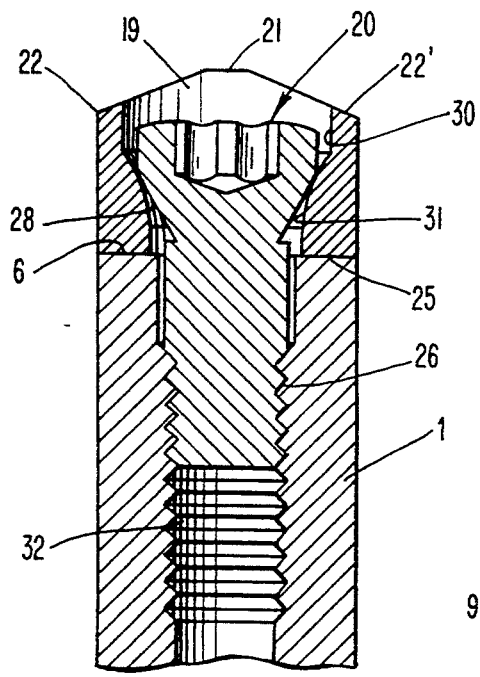
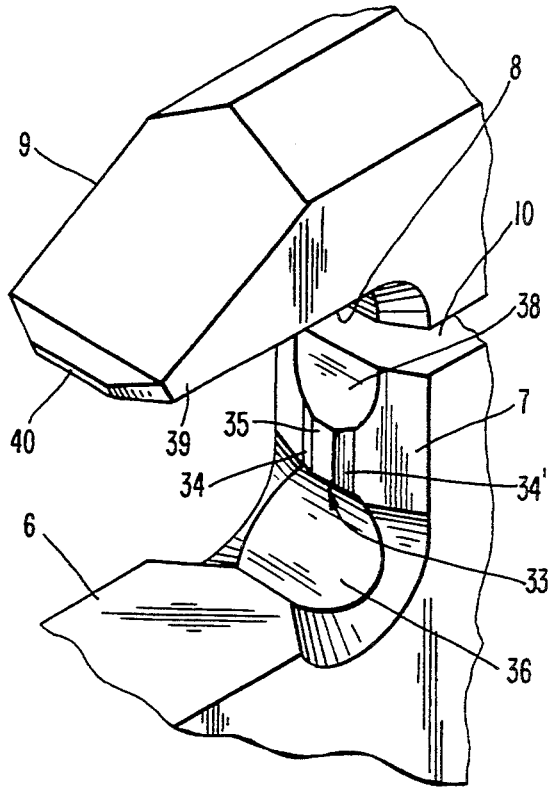
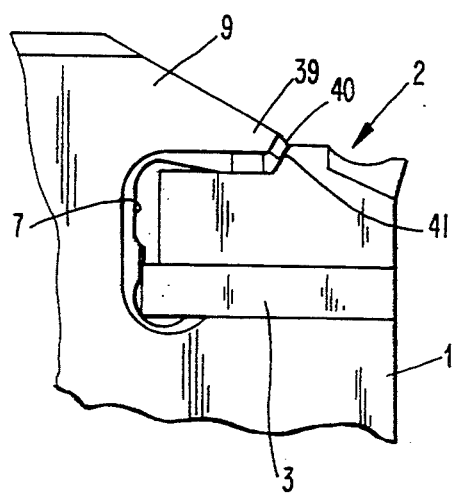

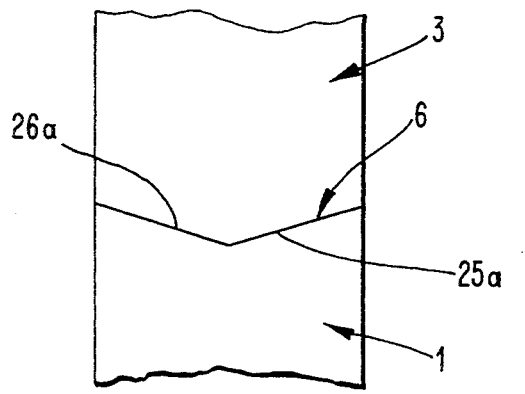
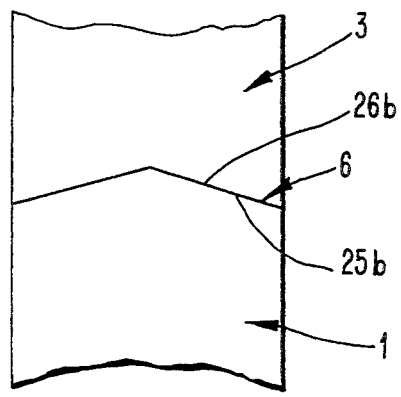
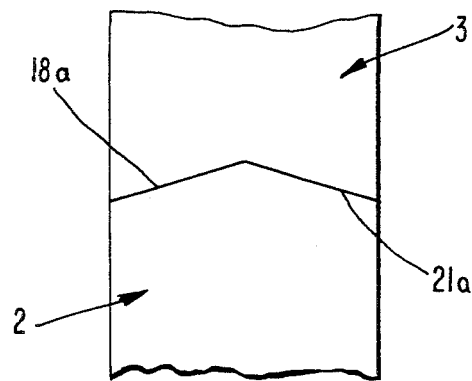
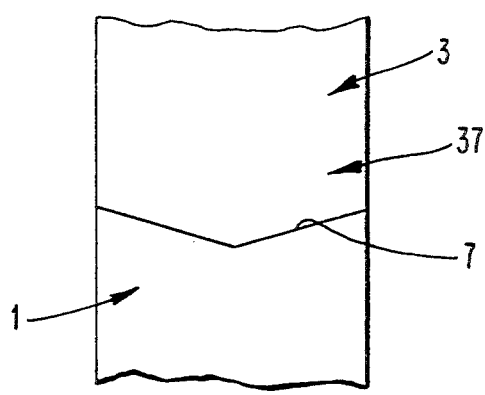
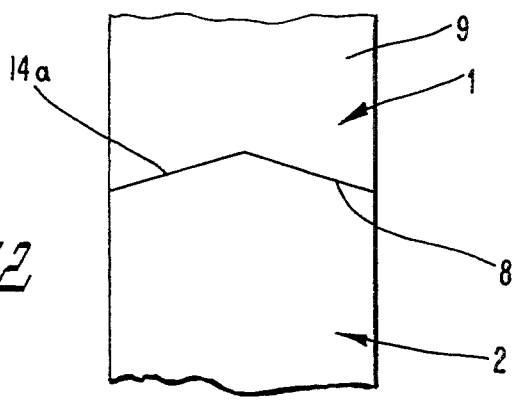

TOOL PROVIDED WITH AN INSERT FOR CUT-OFF OR SIMILAR TURNING OPERATIONS, AND SPACER ELEMENT FOR AN INSERT IN SUCH A TOOL

FIELD OF THE INVENTION

This invention relates to a tool for cut-off or similar turning operations.

BACKGROUND OF THE INVENTION

Since cemented carbide is a relatively expensive material and since cutting tool inserts, when worn-down, must be scrapped and exchanged at relatively short intervals, it is generally desirable to make the inserts for cutting tools as small as possible. Especially during intense processing of the workpieces involved, large amounts of heat are generated in the cutting edge portion of the insert. That heat is conducted through the remainder of the insert. Since the inserts are small and, in conventional cut-off tools, are applied directly against the bottom wall of a recess in a holder plate, only a minor portion of the heat will be emitted into the ambient atmosphere before the heat reaches, in particular, the underlying bottom wall of the recess in the holder plate. This means that the temperature in the portion of the holder plate adjacent the bottom wall of the recess will rise to such a level that the steel material of this plate portion is liable to undergo considerable plastic deformation. This, in turn, may result in the cutting edge of the insert being moved out of its initial or reference position, which is accurately fixed in relation to the plate. This may entail considerable practical inconveniences, not only in the form of dramatically deteriorated measurement accuracy in the processed workpiece, but also, for example, in that the cutting edge, in the final phase of a cut-off operation, will not hit the center of the rotating workpiece. In serious cases, the plastic deformation and the consequential displacement of the insert may give rise to tool breakage as well.

The measure of providing a simple spacer plate between a cemented carbide insert and an insert holder in the form of a tool shank is previously known in connection with conventional turning tool holders. Further, from EP 0 000 426 and DE 31 19 834, it is previously known in connection with cut-off tools to arrange the insert in a special, detachable, substantially U-shaped insert which, in turn, is applied in the recess of the insert-holder plate. In these cases, the U-shaped insert must be made of a relatively elastic material, more specifically steel, which does not have particularly good heat-resisting properties, at least when compared to cemented carbide.

Moreover, U.S. Pat. No. 3,543,363 discloses a cut-off tool in which a special spacer element or anvil seat comprising an insert-receiving seat of V-shaped cross-section is disposed between the insert and the bottom wall of the recess in the holder plate. In this case, the anvil seat is permanently connected to the holder plate, more specifically by gluing or brazing the underside of the anvil seat to the bottom wall of the recess. Also, the anvil seat does not have the explicit function of making the removal of heat from the insert more effective (the U.S. publication is completely silent on the material of which the anvil seat is to be made). This means that simple and quick dismounting and remounting of the anvil seat is not possible. Moreover, the simple glue or solder layer between the anvil seat and the bottom wall of the recess provides no reliable retention of the anvil seat and the insert placed thereon, especially not when the insert is subjected to lateral stresses.

SUMMARY OF THE INVENTION

The present invention is directed to overcoming the above-mentioned drawbacks and others in prior-art cut-off tools and to providing a tool in which the risk of plastic deformation in the insert holder plate is minimized or eliminated while maintaining the setting accuracy of the cutting edge. A basic object of the invention thus is to make more efficient the removal of the heat generated in the area of the cutting edge of the insert in order to prevent the temperature in the surrounding portions of the holder plate from reaching such levels that there is an serious risk of plastic deformation of the steel material. Another object of the invention is, while eliminating such risk of deformation, to ensure safe retention of the insert in the desired initial position also under severe and/or intense processing conditions. Yet another object of the invention is to eliminate or minimize the risk of the occurrence of mechanical damage to the insert holder plate in those cases where the insert proper is damaged, e.g., by crack formation or chipping, so as to ensure longer service life of the insert holder plate.

According to one aspect of the invention, a tool for cut-off or similar turning operations is provided. The tool includes a holder in the form of a comparatively thin plate or plate-like part of a first material, such as steel, and a cutting insert of a second, harder material, such as cemented carbide. The holder plate has, in at least one free end thereof, an outwardly opening recess substantially defined by a bottom wall, an inner or rear wall, and an upper wall which is part of an elastically movable clamping arm formed in the plate and serving to retain the insert in the recess. The insert has both upper and lower grooves (or, alternatively, ridges) of substantially V-shaped cross-section, which are adapted to cooperate with ridges (or grooves) of a corresponding V-shaped cross-section provided in conjunction with the recess.

According to another aspect of the invention, a spacer element or anvil seat for use with the above-mentioned tool is provided. The spacer element is preferably capable not only of abducting heat before it reaches the insert holder plate, but also is preferably capable of firmly retaining the insert in its initial reference position. A further object is to provide a spacer element which is easy to dismount and exchange.

BRIEF DESCRIPTION OF THE DRAWINGS

The present invention can be further understood with reference to the following description in conjunction with the appended drawings, wherein like elements are provided with the same reference numerals.

FIG. 1 is a partial perspective view of a tool according to one embodiment of the present invention, including an insert and a spacer element or anvil seat mounted in place;

FIG. 2 is a partial perspective view of a tool according to an embodiment of the present invention showing the tool without insert and spacer element, and with a clamping screw also removed;

FIG. 3 is an enlarged perspective view of an insert for the tool according to an embodiment of the present invention;

FIG. 4 is a perspective, exploded view showing a spacer element with an associated locking or connecting screw according to an embodiment of the present invention;

FIG. 5 is an enlarged, cross-sectional view of a spacer element and an associated locking screw in a locking position according to an embodiment of the present invention;

FIG. 6 is a perspective view, on an enlarged scale, of an inner wall of an insert-receiving recess according to an embodiment of the present invention;

FIG. 7 is a partial side view of an insert and a spacer element mounted in a tool according to an embodiment of the present invention;

FIG. 8 is a schematic, cross-sectional view of a portion of an interface between a holder and a spacer according to an embodiment of the present invention;

FIG. 9 is a schematic, cross-sectional view of a portion of an interface between a holder and a spacer according to another embodiment of the present invention;

FIG. 10 is a schematic, cross-sectional view of a portion of an interface between a spacer and a holder according to an embodiment of the present invention;

FIG. 11 is a schematic, cross-sectional view of a portion of an interface between a rear end of a spacer and an inner wall of a holder according to an embodiment of the present invention; and FIG. 12 is a schematic, cross-sectional view of a portion of an interface between a spacer and a holder according to an embodiment of the present invention.

DESCRIPTION OF THE PREFERRED EMBODIMENT

The cut-off tool illustrated in FIG. 1 includes a holder, generally designated 1, a cutting insert 2, as well as a spacer element or anvil seat 3. Moreover, a clamping screw is designated 4. The holder 1 has the shape of a relatively thin plate or plate-like part, which is made of steel or equivalent material. In practice, the holder plate 1 often has a rectangular, elongate form and is provided, in at least one of its opposite ends, with an outwardly opening recess 5 (see also FIG. 2), which is substantially defined by a bottom wall 6, an inner or rear wall 7, and an upper wall 8 which is part of an elastically movable clamping arm 9 formed in the plate and serving to retain the insert 2 in the recess. In the embodiment shown in FIG. 2, the plate 1 has a slot 10 which is terminated at its inner end by a through hole 11 extending transversely of the plane of the plate. The slot 10 serves to impart to the clamping arm 9 appreciable elasticity, although the length of the clamping arm, measured from the rear wall 7 of the recess 5, is relatively limited. By being elastically yieldable, the arm 9 is pivotable in a known manner downward toward the bottom wall 6 of the recess 5 by means of the clamping screw 4.

The insert 2 shown in FIG. 3 is a body preferably made of cemented carbide, which has at its front end a main cutting edge 12, adjacent to which chip-breaking surfaces 13 are formed on the upper side of the body. In the area behind this chip-breaking part of the insert body, there is formed a groove 14 of substantially V-shaped cross-section. This groove 14, which is divided into front and rear portions 14' and 14", respectively, is defined by two flank surfaces 15, 15', between which there is a central groove portion 16 having a concavely rounded shape. The portion 14" of the groove located adjacent the rear end of the insert 2 passes via an upset line 17 into a front portion 14' having the same cross-sectional shape as the rear portion, but making an obtuse angle with the rear portion, as seen in the longitudinal extent of the insert body. In practice, the rear portion 14" of the V-groove 14 is preferably substantially parallel to the underside of the insert body 2 or makes an extremely small angle therewith (e.g., on the order of 0.1°–2°), while the front portion 14' extends obliquely downwardly and forwardly at an angle of 3°–10°, suitably 5°–7°, relative to the underside. The insert body 2 preferably also is formed with a groove 18 or V-shaped cross-section in its underside. In practice, the grooves 14, 18 may have one and the same V-shape on the upper side and on the underside.

Although, in the embodiment illustrated in FIG. 3, the cutting edge 12 extends at right angles to the longitudinal extent of the insert 2, the location and the shape of the cutting edge may vary considerably. Thus, the insert 2 may be designed with circular or partially round cutting edges. Moreover, in the case of a straight cutting edge, the cutting edge may also be inclined relative to the longitudinal extent of the insert 2. Characteristic of all the possible embodiments, however, is that the length of the cutting edge or its extent transversely of the longitudinal axis of the insert 2 is at least slightly larger than, respectively, the thickness of the holder plate 1 and the width of the portion of the insert itself located behind it, such that the insert and the holder plate are accommodated in a groove made by the cutting edge in a workpiece.

FIG. 4 illustrates a spacer element or anvil seat 3 according to a preferred embodiment of the invention. This element consists of a substantially flat body 3 which, in the illustrated embodiment, has a basic rectangular shape. Like the insert 2, the body 3 is made of cemented carbide or other equivalent material having higher heat resistance than steel. In the area of the front end of the body, there is provided a through hole 19 for a locking or connecting screw 20. The upper side of the spacer element or body 3 is preferably designed as a ridge 21 of V-shaped cross-section, which is defined by two inclined flank surfaces 22, 22', between which there is a longitudinal central portion 23 having a convexly rounded shape. The rounded central portion 23 has a larger diameter than the central portion 16 in a cooperating V-groove 18 in the insert 2, such there exists, between the respective central portions 16, 23 of the insert 2 and the spacer body, a clearance of crescent-shaped cross-section. At its rear end, the spacer body 3 has a female groove 24 extending vertically from the upper side to the underside 25 of the spacer body. In the embodiment illustrated in FIG. 4, the underside 25 of the body 3 is in the form of a planar, substantially rectangular surface to be applied against the similarly planar surface forming the bottom wall 6 of the recess 5 in the holder plate, as seen in FIGS. 1 and 2.

In addition to a threaded shank 26, the locking screw 20 has a thickened head 27, the lower portion 28 of which is tapered, suitably conically, toward the threaded shank. In the upper face of the screw head 27, there is, for example, a starformed seat 29 for receiving a key wrench.

As shown FIG. 5, the hole 19 of the spacer body 3 is defined at the top by a cylindrical surface 30 of a relatively large diameter, which passes at the bottom into a rotationally symmetric surface 31 having a diameter which decreases in the downward direction. The surface 31 is preferably not conical, however, but arched. The threaded shank 26 of the screw 20 is to be screwed into an internally threaded hole 32 in the insert holder plate 1. The hole 32, opening into the bottom wall surface 6 (see FIG. 2), is located centrally in the plate 1 relatively close to the front short end of the insert holder plate.

According to a preferred embodiment of the invention, the distance between the center of the hole 32 and the inner wall 7, against which the rear short end of the spacer element 3 is applied, is slightly shorter than the distance between the center of the hole 19 and the rear short end. As a result, the screw 20, when tightened, exerts, by its substantially conically tapering head, a force on the spacer element 3, which is directed in the longitudinal extent thereof and which urges the spacer element most forcefully against the inner or rear wall 7 of the recess 5. The difference in distance mentioned above may be relatively small and, in practice, amount to one or a few tenths of a millimeter.

In practice, the actual contact between the rear end of the spacer element 3 and the inner wall 7 of the recess 5 takes place between the female, vertical groove 24 and a male projection 33 (see FIG. 6) on the inner wall 7 of the recess, the projection 33 and the groove-shaped recess 24 together forming a male-female connection between the spacer element and the insert holder plate 1. The projection 33 may be formed in many different ways. It is preferred, as shown in FIGS. 2 and 6, to design the projection 33 as a ridge of substantially V-shaped cross-section and of the same basic design as the ridge 21 formed on the upper side of the spacer element 3. Thus, the V-ridge 33 is defined by two flank surfaces 34, 34' and an intermediate, convexly rounded central portion 35. A V-ridge (not shown) of this type is also formed on the underside of the clamping arm 9, i.e., the upper wall 8 of the recess 5, for cooperating with the V-groove 14 on the upper side of the insert 2. By designing the V-ridge on the underside of the clamping arm 9 and the V-ridge forming the projection 33 on the inner wall 7 of the plate 1 with the same cross-sectional shape, it is convenient, in the making of the insert holder, to use one and the same form cutter for providing these two details. It is further preferable to provide the V-ridges on the clamping arm 9 and the inner wall 7 of the plate 1 in a continuous working operation.

As seen in FIG. 6, in the area below the V-ridge 33 in the inner wall 7, there is a transverse recess 36 for ensuring that a lower, inner edge portion 37 of the spacer dement 3 (see FIG. 1) comes clear of the insert holder plate 1. Also in the area above the V-ridge 33, there is a similar recess 38 extending a certain distance along the underside of the clamping arm 9 and serving to ensure that the upper, rear edge portion of the insert 2 similarly comes clear of the insert holder plate 1.

The V-ridge (not shown) which is formed on the underside 8 of the clamping arm 9 extends -when the insert 2 is in place and the clamping screw 4 is tightened-substantially parallel to the bottom wall surface 6 and hence substantially parallel to the rear portion 14" of the V-groove 14 on the upper side of the insert 2. At its free, outer end, the clamping arm 9 passes into a slightly downwardly-directed nose 39, as shown in FIG. 6. Also, this nose portion 39 has, on its underside, a V-shaped ridge of the type described above, which is intended to engage in the front portion 14' of the upper V-groove 14 of the insert 2. The inclination between the V-ridge on the underside of the nose 39 and the V-ridge located behind it on the underside of the clamping arm 9 is substantially equal to the inclination between the front and rear portions 14' and 14, respectively, of the upper V-groove 14 in the insert 2. In the working position in which the insert 2 is in place and the clamping screw 4 is tightened, the forward and downwardly inclined outer portion of the V-ridge on the underside of the clamping arm 9 will thus engage in the similarly forwardly and downwardly inclined, countersunk front portion 14' of the V-groove 14 in the insert 2 so as to provide positive locking of the insert in a position in which it is prevented with high reliability from being pulled out of the recess 5 in the axial direction.

The spacer element or anvil seat 3 shown in FIG. 4 is mounted in the recess 5 of the insert holder plate 1 by engaging the V-ridge 33, acting as a male projection, with the female groove 24 in the rear end portion of the spacer element, and tightening the screw 20 in the hole 32. As earlier pointed out, the screw 20 will apply, when being tightened, to the spacer element 3 an axially directed force ensuring a distinct engagement between the V-ridge 33 and the groove 24. This interaction between, on the one hand, the male-female connection formed by the V-ridge 33 at the rear wall 7 of the recess 5 and the V-groove 24 located at the inner end 37 of the spacer element 3 and, on the other hand, the locking screw 20 located in the area of the outer end of the spacer element provides a substantially immovable retention of the spacer element in an accurately defined position in relation to the rest of the insert holder plate 1.

Once the spacer element 3 is mounted in place, the insert 2 is applied in the tool. This is done by pushing the insert 2 in under the clamping arm 9 while the clamping screw 4 is loosely inserted in the associated threaded hole 43. The clamping screw 4 is then tightened until the final clamping force is achieved, the arm 9 clamping the insert 2 in the position shown in FIG. 1. This is a well-defined position in relation to the insert holder 1 itself. Thus, the front transverse surface 40 (see FIG. 6) of the clamping arm 9 forms a stop which engages the similarly inclined surface 41 on the insert 2 (see FIG. 3), which means that the insert cannot be pushed further inward than the position in which the surfaces contact each other. Extraction of the insert 2 is prevented, as earlier pointed out, by the cooperation between the V-ridge on the underside of the nose portion 39 of the clamping arm 9 and the front, inclined portion 14' of the V-groove 14 on the upper side of the insert 2. Lateral movements of the insert 2 are prevented by the cooperation of, on the one hand, the V-grooves 14, 18 on the upper and lower sides of the insert and, on the other hand, the V-ridge on the underside of the clamping arm 9 and the V-ridge 21 on the upper side of the spacer element 3. In the working position, the insert 2 is thus immovably retained in the desired reference position, not only in connection with simple cut-off operations, but also in connection with other operations in which the insert is subjected to both lateral forces and forces of extraction, such as groove turning, contour turning and undercutting.

A major advantage of the inventive tool is that the spacer element 3, made of cemented carbide, has considerably higher heat resistance than the steel in the insert holder plate 1. Therefore, the heat generated in the area of the cutting edge 12 of the insert 2 is removed not only via the insert itself but also via the spacer element 3. In this manner, it is ensured that the temperature in the insert holder plate 1 will not rise to such a level that a considerable plastic deformation of the steel will take place. Thus, the insert 2 does not run the risk of being moved out of its reference position initially fixed in relation to the insert holder 1. Another advantage of the spacer element 3 is that it makes it possible to increase the life of the insert holder 1, for instance by reducing the risk of mechanical damage to the insert holder. If the insert 2 is damaged, e.g., by chipping or crack formation, this need not result in subsequent damage to the insert holder plate 1 itself, thanks to the provision of the spacer element or anvil seat 3 as an extra safety component between the insert and the subjacent portion 6 of the insert holder plate. If, therefore, the spacer element 3 is damaged as a result of damage to the insert 2, it is only necessary to replace the spacer element, not the entire insert holder 1. Exchanging the spacer element 3 is also very easy to do, since only a simple locking screw 20 need be removed.

The invention is not restricted only to the embodiment described above. For instance, the locking screw 20 is replaceable with other connecting means between the spacer element 3 an the insert holder plate 1, e.g., a pin. Instead of a planar underside, the spacer element 3 may have an underside of V-shaped cross-section (e.g., 25a) e.g., either a ridge or a groove for cooperating with a bottom wall 6 either a groove 26a or a ridge 26b, respectively, of analogous V-shaped cross-section, as seen in FIGS. 8 and 9, respectively. Also, the design of the male-female connection between the rear end 37 of the spacer element 3 and the inner wall 7 of the insert-receiving recess 5 may deviate from the design shown, for example, in FIGS. 1 and 6, e.g., by forming a male element on the rear end of the spacer element 3 and a female element in the inner wall 7, as seen in FIG. 11. It should also be pointed out that the insert holder plate 1 need not in itself form a shank, as is the case in the embodiment shown in the drawings. Thus, the insert holder plate need only form a minor portion of the tool and, for instance, be disposed transversely of a thicker shank. Although the embodiment shown in the drawings includes an insert 2 whose V-formation consists of a groove on both the upper side and the underside for cooperating with analogous V-ridges on the underside of the clamping arm 9 and the upper side of the spacer element 3, respectively, one or, preferably, both of the V-formations on the insert may be formed as ridges, e.g., a top ridge 14a and a Polton ridge 18d to cooperate with analogous V-grooves on the underside of the clamping arm, e.g., the upper wall 8 and on the upper side of the spacer element, respectively, as seen in FIGS. 11 and 12, respectively.

While this invention has been illustrated and described in accordance with a preferred embodiment, it is recognized that variations and changes may be made therein without departing from the invention as set forth in the claims.

What is claimed is:

1. A tool for cut-off or similar turning operations comprising:

a holder plate, the holder plate having a main portion and a portion forming a clamping arm elastically joined to the, main portion, the holder plate having, in at least one free end thereof, an outwardly opening recess extending into a forward end of the holder plate in a first direction, the recess being substantially defined by a bottom wall, an inner wall, and an upper wall, the bottom wall and the inner wall forming at least a part of the main portion, and the upper wall forming part of the clamping arm;

a cutting insert disposed in the recess in the holder plate;

a spacer disposed between the insert and the bottom wall of the recess;

an upper side of the spacer being formed as a V-shaped ridge and an underside of the insert being formed as a V-shaped groove, the V-shaped ridge and the V-shaped groove extending along an axis in the first direction, the upper side of the spacer engaging with the underside of the insert by the V-shaped ridge being received in the V-shaped groove;

means for engaging the spacer to the holder plate in the area of the bottom wall;

a rear end of the spacer engaging with the inner wall; and an upper side of the insert engaging with an underside of the clamping arm.

2. A tool as claimed in claim 1, wherein the second engaging means includes an underside of the spacer formed as a V-shaped ridge and a corresponding V-shaped groove in the bottom wall of the recess.

3. A tool as claimed in claim 1, wherein the rear end of the spacer is formed with a female groove or seat and a male projection is formed on the inner wall, the rear end of the spacer and the inner wall engaging by the male projection being received in the female groove or seat.

4. A tool as claimed in claim 3, wherein a V-shaped groove is formed in an upper side of the insert and a V-shaped ridge is formed on an underside of the clamping arm, the upper side of the insert engaging with the underside of the clamping arm by the V-shaped ridge on the underside of the clamping arm being received in the upper V-shaped groove of the insert.

5. A tool as claimed in claim 1, wherein a V-shaped groove is formed in the upper side of the insert and a corresponding V-shaped ridge is formed on the underside of the clamping arm, the upper side of the insert engaging with the underside of the clamping arm by the V-shaped groove on the upper side of the insert being received in the V-shaped ridge on the underside of the clamping arm.

6. A tool as set forth in claim 5, wherein the upper side of the insert and the V-shaped groove include a grooved front portion and a grooved rear portion, the grooved front portion being disposed farther from the inner wall than the grooved rear portion and being inclined downwardly from the grooved rear portion, the underside of the clamping arm and the V-shaped ridge including a ridged front portion and a ridged rear portion, the ridged front portion being inclined downwardly relative to the ridged rear portion, the grooved front portion engaging with the ridged front portion and preventing movement of the insert in a second direction, the second direction being opposite to the first direction, and the grooved rear portion engaging with the ridged rear portion.

7. The tool as claimed in claim 4, wherein the clamping arm has, at a forward end thereof, a substantially planar surface formed at an angle to the axis extending in the first direction, and the insert has a substantially planar surface formed at an angle to the axis extending in the first direction and complementary to the surface at the forward end of the clamping arm, that abuts against the surface at the forward end of the clamping arm to restrict movement of the insert in the first direction.

8. A tool as claimed in claim 1, wherein the second engaging means includes a screw having a head, the screw having, in a transition from the head to a threaded shank, a downwardly tapering contact surface for cooperating with a countersunk seat surface, the seat surface being located on a level below the upper side of the spacer in a through hole formed in the spacer, the seat surface tapering downward in the hole similarly to the tapering contact surface on the screw, and an internally threaded hole formed in the bottom wall of the recess, the threaded hole in the bottom wall of the recess being formed closer to the inner wall than the through hole in the spacer is formed to a rear end of the spacer so that a force urging the rear end of the spacer against the inner wall is caused by tightening of the screw in the threaded hole in the bottom wall of the recess and the through hole in the spacer.

9. A tool as claimed in claim 1, wherein an underside of the spacer is planar and engages a similarly planar surface forming the bottom wall of the recess.

10. A tool as claimed in claim 1, wherein the second engaging means includes an underside of the spacer formed as a V-shaped groove and a corresponding V-shaped ridge on the bottom wall of the recess.

11. A tool as claimed in claim 1, wherein a male projection is formed in a rear end of the spacer and a female groove or seat is formed on the inner wall, the rear end of the spacer and the inner wall engaging by the male projection being received in the female groove.

12. A tool as claimed in claim 11, wherein a V-shaped ridge is formed in an upper side of the insert and a V-shaped groove is formed on an underside of the clamping arm, the upper side of the insert engaging with the underside of the clamping arm by the V-shaped groove on the underside of the clamping arm receiving the upper V-shaped ridge of the insert.

13. A tool as claimed in claim 1, wherein a V-shaped ridge is formed on the upper side of the insert and a corresponding V-shaped groove is formed in the underside of the clamping arm, the upper side of the insert engaging with the underside of the clamping arm by the V-shaped ridge on the upper side of the insert Being received in the V-shaped groove in the underside of the clamping arm.

14. A tool as claimed in claim 1, wherein the holder plate is made of steel and the insert and the spacer are made of a material other than steel and having heat resistant properties such that plastic deformation of the holder plate is less than if the insert and the spacer were made of steel.

15. A tool as claimed in claim 14, wherein the insert and the spacer are made of cemented carbide.

16. The tool as claimed in claim 1, wherein the clamping arm has, at a forward end thereof, a substantially planar surface formed at an oblique angle to the axis extending in the first direction, and the insert has a substantially planar surface formed at an oblique angle to the axis extending in the first direction and complementary to the surface at the forward end of the clamping arm, that abuts against the surface at the forward end of the clamping arm to restrict movement of the insert in the first direction.

17. The tool as claimed in claim 1, wherein the upper side of the insert includes an insert front portion and an insert rear portion, the insert front portion being disposed farther from the inner wall than the insert rear portion and being inclined downwardly from the insert rear portion, the underside of the clamping arm including a clamping arm front portion and a clamping arm rear portion, the clamping arm front portion being inclined downwardly relative to the clamping arm rear portion, the insert front portion engaging with the clamping arm front portion and preventing movement of the insert in a second direction, the second direction being opposite to the first direction, and the insert rear portion engaging with the clamping arm rear portion.

18. The tool as claimed in claim 1, wherein a rear end of the insert is spaced at a distance from the inner wall.

19. The tool as claimed in claim 1, wherein a width of a cutting edge of the insert at a front end of the insert is larger than a thickness of the holder plate, a width of the spacer, and a width of a remaining portion of the insert such that the insert, the spacer, and the holder plate are adapted to be accommodated in a groove in a workpiece formed by the cutting edge.

20. A tool for cut-off or similar turning operations comprising:

a holder plate, the holder plate having a main portion and a portion forming a clamping arm elastically joined to the main portion, the holder plate having, in at least one free end thereof, an outwardly opening recess extending into a forward end of the holder plate in a first direction, the recess being substantially defined by a bottom wall, an inner wall, and an upper wall, the bottom wall and the inner wall forming at least a part of the main portion, and the upper wall forming part of the clamping arm;

a cutting insert disposed in the recess in the holder plate;

a spacer disposed between the insert and the bottom wall of the recess;

an underside of the insert being engageable with an upper side of the spacer;

means for engaging the spacer to the holder plate in the area of the bottom wall;

a rear end of the spacer engaging with the inner wall; and an tipper side of the insert engaging with an underside of the clamping arm, wherein the clamping arm has, at a forward end thereof, a substantially planar surface formed at an oblique angle to the axis extending in the first direction, and the insert has a substantially planar surface formed at an oblique angle to the axis extending in the first direction and complementary to the surface at the forward end of the clamping arm, that abuts against the surface at the forward end of the clamping arm to restrict movement of the insert in the first direction.

21. A tool as claimed in claim 20, wherein a V-shaped groove is formed in the upper side of the spacer formed and a corresponding V-shaped ridge is formed on an underside of the insert, the tipper side of the spacer engaging with the underside of the insert by the V-shaped ridge being received in the V-shaped groove.

* * * * *